Aug. 17, 1965  E. T. BOOTH  3,201,586
METHOD AND APPARATUS FOR RADIOACTIVE GAS ANALYSIS
USING NEUTRONS OF TWO ENERGY LEVELS
Filed May 27, 1948
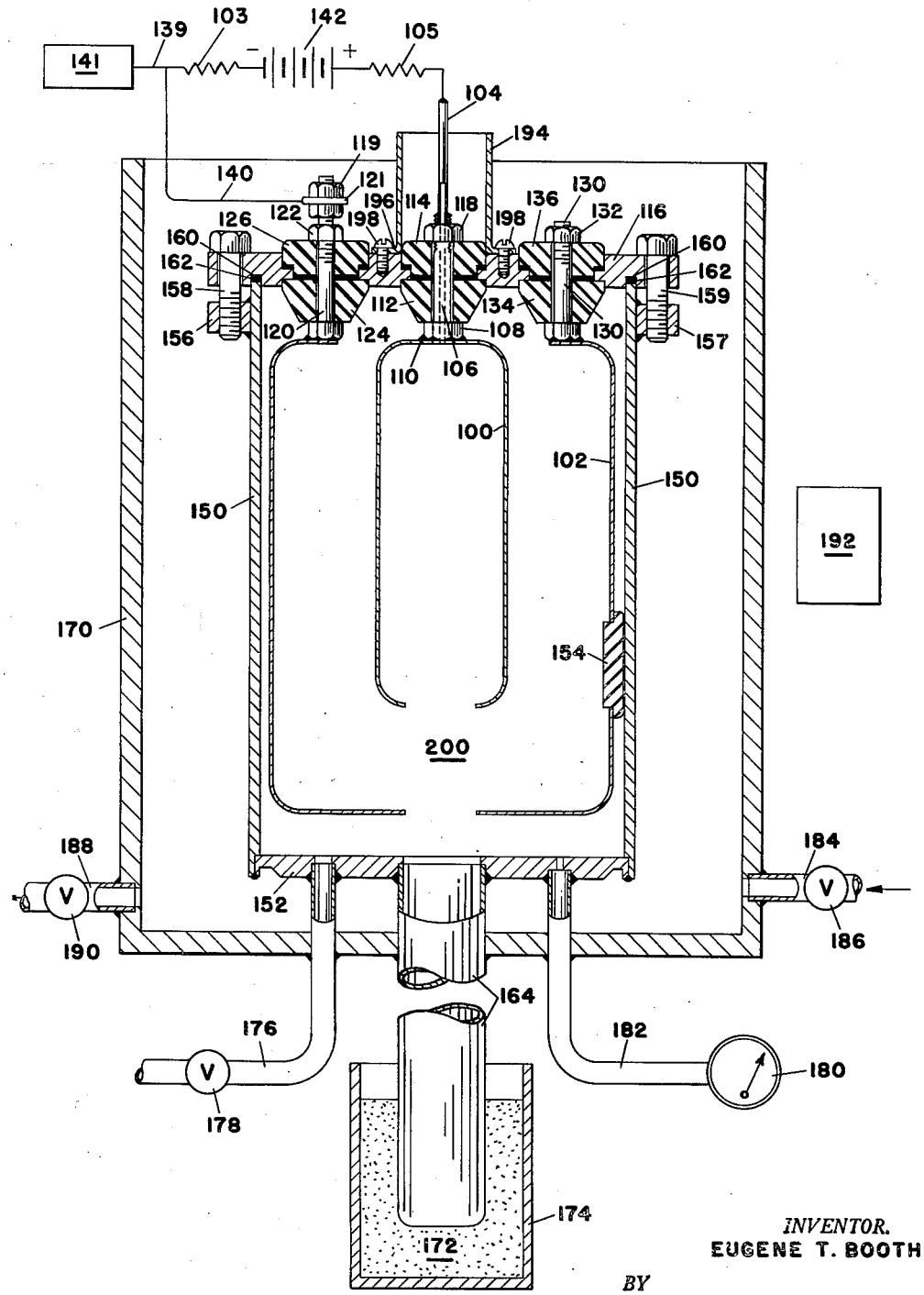
INVENTOR.
EUGENE T. BOOTH
BY
Roland A. Anderson
Attorney United States Patent Office 3,201,586
Patented Aug. 17, 1965

3,201,586
METHOD AND APPARATUS FOR RADIOACTIVE GAS ANALYSIS USING NEUTRONS OF TWO ENERGY LEVELS
Eugene T. Booth, New York, N.Y., assignor to the United States of America as represented by the United States Atomic Energy Commission
Filed May 27, 1948, Ser. No. 29,437
8 Claims. (Cl. 250—43.5)

The present invention relates to a method and apparatus for determining composition of a gaseous substance, which apparatus may be adapted to use in a mechanism for controlling the composition of gaseous mixtures.

In recent years, considerable attention has been devoted to compositions, at least some of the components of which are isotopes which have useful nuclear properties. The determination of the isotopic composition of such mixtures and the determination of compositions of other gaseous mixtures, the chemical and physical properties of which are very similar, makes analysis of such mixtures very difficult. Examples of isotopic mixtures which have useful properties and the compositions of which are difficult to determine, are to be found in the field of biology or biophysics in the rapidly increasing use of tracers and in the field of atomic energy.

It is an object of the present invention to provide a method of analyzing gaseous mixtures for the components thereof.

It is another object of the present invention to provide an apparatus suitable for determining the composition of gaseous substances, the components of which have very similar physical and chemical properties.

It is still another object of the present invention to provide an apparatus which is readily adaptable to controlling the composition of mixture of gases.

It is a further object of the present invention to provide a method and apparatus for determining the isotopic composition of gaseous mixtures of isotopes such as the isotopes of uranium.

Other objects of the present invention will be in part obvious and in part pointed out hereinafter.

In one of its broader aspects the method of the invention may be carried out by maintaining a gaseous sample of a substance ambient to a set of electrodes, maintaining a predetermined voltage drop between members of said set, subjecting said gaseous substance to the action of a flux of relatively high energy neutrons, measuring the pulse current rate of flow between the electrodes of said set across which said potential drop is maintained, subjecting said gaseous substance to a flux of neutrons having a different energy from those to which said substance was previously subjected, measuring the pulse current rate of flow between said electrodes of said set across which said voltage is maintained, and correlating said current measurements to determine the composition of said substance.

An apparatus which is suitable for carrying out the above described method comprises in general means for containing a gaseous substance, a set of electrodes within said gas containing means, the members of said set being electrically connected to a source of direct current so as to maintain a relatively high voltage between the members of said set, pulse current measuring means connected to at least one of said electrodes whereby pulse current flowing between the members of said set of electrodes is measured.

The apparatus and method may be more clearly described with reference to the drawing which is a central vertical section of an analyzer incorporating the present invention with a suitable electrical system connected thereto. The apparatus consists of an inner electrode 100 and an outer electrode 102, which envelops inner electrode 100. Both electrodes are cylindrical in shape and are positioned concentrically with respect to each other and with respect to a cylindrical container 150. The electrode 100 and the electrode 102 are supported in the container 150 by bolts 120, 130 and 106, which extend through the top plate 116 of the container 150. The bolts 120, 106 and 130 are electrically insulated from the top plate 116 of container 150 by the pairs of insulating spacers 124 and 126; 112 and 114; and 134 and 136 respectively. The nuts 122, 118, 132 are tightened on the bolts 120, 106 and 130 respectively to compress the pairs of insulating spacers 124 and 126; 112 and 114; and 134 and 136 respectively, thereby causing said spacers to conform to the openings in top plate 116, through which said pairs of spacers extend, and thereby forming a hermetic seal between said spacers and the top plate 116, such that gas will not pass from one side of the top plate 116, to the other.

The top plate 116 is held to the cylindrical container 150 by the bolts 158 and 159 which extend through the top plate 116 near its perimeter and which are tightened in the threaded lugs 156 and 157 respectively. The top plate 116 is hermetically sealable to the cylinder 150 by the compression of the gasket 162 in the groove 160 in the top plate 116 in a tongue and groove fashion. The bottom plate 152 of the cylindrical container 150 is welded thereto at its perimeter. The electrically insulated spacer 154 and two others not shown prevent contact of the outer electrode 102 with the cylindrical container 150. The tank 170 envelops the cylindrical container to a sufficient height to permit the top plate 116 to be covered with a fluid contained in the tank 170. The conduits 184 and 188 provide for ingress and egress of fluid to and from the tank 170. Valves 186 and 190 regulate the flow through the conduits 184 and 188 respectively. The conduit 176, flow through which is regulated by valve 178, is sealed through the bottom of tank 170 and attached to the bottom plate 152 of the cylindrical container 150 to provide a means of introducing and removing fluids from cylindrical container 150. The conduit 182, which is similarly sealed through the bottom of tank 170 to the bottom plate of 152 of the cylindrical container 150 provides means for transmitting the fluid pressure within cylindrical container 150 to the pressure indicating gauge 180. The volume within the cylindrical container 150 is referred to as the sealed chamber 200. This chamber includes the volume between the electrodes 100 and 102, the volume between the electrodes 102 and container 150, the volume within the electrode 100 and the volume in the lower part of the container 150 and in the closed end conduit 164. The large diameter closed end conduit 164 is sealed through the bottom of tank 170 and is attached to the bottom plate 152 of the cylindrical container 150 at the open end of said closed end conduit 164. The closed end of said closed end conduit extends a sufficient distance below the bottom of tank 170 to provide for the cooling thereof by immersion in a coolant as indicated by 172. Such a coolant may be applied to the closed end of conduit 164 by raising and lowering coolant container 174. The box 192 represents a source of high energy neutrons, which neutrons permeate sealed chamber 200. The cylindrical collar 194 is attached at its annular flange 196 to top plate 116 by the screws 198 which are threaded into top plate 116. The cylindrical collar 194 prevents contact of fluid in container 170 with the positively charged electrical connection 104.

A high voltage in the order of 1500 volts is impressed across the space in the high pressure chamber 200 between the electrodes 100 and 102 by connecting the source of direct current 142 with said electrodes. The electrode 100 is connected by means of electrical connection 104, preferably through a resistance 105 to the positive pole of the source of direct current 142, thereby making the electrode 100 positively charged to the extent of 1500 volts with respect to the electrode 102. Electrode 102 is preferably connected through the electrical connection 140 and resistance 103 to the negative pole of said source of direct current 142. A conventional pulse current detecting, amplifying and discriminating means 141 is connected to the circuit by electrical connection 139 between the resistance 103 and the cathodic electrode 102. The nuts 119 and 121, at the threaded extremity of screw 120 may be tightened together to maintain an electrical connection between electrical conduit 140 and the screw 120 connecting with the cathodic electrode 102.

The apparatus of the present invention such as has been illustratively described above may be operated by one of several alternative procedures. One of the preferred methods of operation is as follows: A sample of uranium hexafluoride containing a mixture of the $U^{235}$ and $U^{238}$ isotopes is introduced in the gaseous state into the sealed chamber 200. The $UF_6$ gas enters the sealed chamber 200 through the conduit 176, valve 178 being kept open. A coolant material such as a mixture of water and wet ice in container 174 is applied to the lower portion of closed end conduit 164, which coolant maintains said lower portion of said conduit 164 at 0° C. A portion of the $UF_6$ so entering is condensed in the lower portion of the closed end conduit 164 because of the cooling action of coolant 172 thereon. After a few grams of the $UF_6$ have been condensed, the valve 178 is closed and a period of time is allowed to pass, during which the solid phase $UF_6$ in the lower portion of the closed end conduit 164 is allowed to reach an equilibrium with the gaseous phase $UF_6$ in the sealed chamber 200. This equilibruim is reached when the pressure indicated by the gauge 180 remains constant. A voltage drop of 1500 volts is impressed across the space between the anodic electrode 100 and the cathodic electrode 102, thereby making the electrode 100 positively charged with respect to the electrode 102 and setting up an electric field in the space therebetween. A flux of high energy neutrons from neutron source 192 permeates the sealed chamber 200, passing through the tank 170, and the cylindrical container 150, before entering the enclosure 200. The interaction of neutrons of this flux with atoms of uranium in the sealed chamber 200 causes a number of fission reactions to occur, which fission reactions result in the ionization of the $UF_6$ gas in the sealed chamber 200. The voltage existing between the electrode 100 and the electrode 102 causes the ions formed by the fission process to carry a pulse current across the gap between the electrodes 100 and 102. The flow of the pulse current between the electrodes results in a similar pulse current flowing through the conduit 140 and 139. The amplifier 141 detects and magnifies this pulse current after it flows through electrical conduit 139. The flowing of such a pulse current is registered on an oscillograph or other conventional pulse measuring or recording devices.

After the rate of fission pulse production has been determined under these conditions, valve 186 is opened and a liquid hydrogenous material such as water or a hydrocarbon is introduced into the tank 170 through the conduit 184. This hydrogenous material is thus interposed between the source of high energy neutrons 192 and the sealed chamber 200. The interposition of a hydrogenous material between the neutron source 192 and the sealed chamber 200 acts to moderate the neutrons entering said sealed chamber 200. The number of high energy neutrons entering the sealed chamber 200 is considerably reduced because in passing through a hydrogenous moderator the energy of most high energy neutrons is reduced. The net result is that a large percentage of the neutrons entering the chamber 200 are thermal energy neutrons. As is well know, the interaction of thermal neutrons with $U^{238}$ results in a negligible number of fission reactions but the interaction of thermal neutrons with the $U^{235}$ isotope results in a very considerable number of fission reactions. The rate of fission pulse production is again determined. The rate of current pulses produced while thermal neutrons are permeating the sealed chamber 200 will be primarily the result of $U^{235}$ fission, whereas the rate of pulse production while high energy neutrons are permeating the sealed chamber 200 is predominantly the result of $U^{238}$ fission. When the gas sample in chamber 200 is exposed to a neutron flux in which thermal energy neutrons predominate, the fission rate is given by the expression $$F_1 = K_1 N + K_2 (1-N)$$

where:

N is the mole fraction of $U^{235}$ isotope, and
$(1-N)$ is the mole fraction of $U^{238}$ isotope, and
$K_1$ and $K_2$ are constants, and
$F_1$ is the specific fission rate.

If the $UF_6$ sample in sealed chamber 200 is exposed to a flux of predominately high energy neutrons, the specific fission rate $F_2$ is given by the expression, $$F_2 = K_3 N + K_4 (1-N)$$

where:

N and $(1-N)$ are the values indicated above, and
$K_3$ and $K_4$ are characteristic constants.

The constants $K_1$, $K_2$, $K_3$, and $K_4$ may be determined by the treatment of samples of known isotopic composition in the sealed chamber 200 and the compositions of unknown samples may be determined from fission rate counts employing these determined constants in calculations. The pressure of the gas sample in the apparatus must be maintained at the same value for each succeeding sample. The constants K are characteristics of a particular apparatus and must be determined therefor. If calibration of the instrument is carried out, one fission count of an isotopic uranium mixture employing thermal neutrons or high energy neutrons as the fission activator is sufficient.

It may be seen from the above description that the present invention provides a very effective method and apparatus for determining the isotopic compositon of a gaseous uranium sample.

It has been found that very little maintenance of the apparatus is required and in addition that the initial cost of construction and installation is correspondingly small. In addition, the apparatus is relatively small and the quantity of gas sample required in order to perform an analysis is just such as will fill the apparatus at the relatively low pressures at which $UF_6$ gas is in equilibrium with the solid at wet ice temperatures. It is, therefore, obvious that use may be made of this apparatus in conjunction with small scale isotope separation apparatus, such as experimental or pilot plant apparatus. Results which have been obtained by use of the present apparatus have been found to be highly reliable and within the desired degree of accuracy.

Alternatives and modifications of the present apparatus will be apparent to those familiar with the art. As an illustration of one such modification, an arrangement of two analyzers in series may be employed in conjunction with suitable recording mechanism to constitute a line recorder. Thus, a first such analyzer is adjusted for analysis of the lighter isotope of a mixture of uranium isotopes by subjecting the enclosed chamber to a flux of thermal energy neutrons. A second analyzer is connected in series with the first so that gas passing from the first is introduced into the second. The same gas sample is thus passed through the two analyzers. By subjecting the enclosed chamber of the second analyzer to the action of relatively high energy neutrons the concentration of the $U^{238}$ isotope in a gas sample passing from the $U^{235}$ analyzer is determined in the second analyzer. The pulse current rate from these two analyzers may be recorded on a moving tape of an apparatus which records a mark on the tape for a certain number of counts per second. In this manner a continuous line recording analyzer which provides a permanent record of the analysis of the various samples may be established.

Preferably, the apparatus of the present invention comprises a set of electrodes in a gas-tight corrosion resistant chamber, said electrodes being insulated from each other and from the walls of said container, and said electrodes being electrically connected through the detachable top plate of said chamber and insulated therefrom, to a source of direct current and to a means for measuring the rate of current pulses flowing between said electrodes through said gas, a source for providing high energy neutrons to said chamber and neutron moderating means for reducing the energy of neutrons entering said chamber to thermal energy. However, the valving, pressure measuring, pressure regulating, current pulse detecting, voltage maintaining, insulating, ion producing and other means need not necessarily be used as shown, but equivalents thereof will be readily apparent to those familiar with the art and may be substituted therefor.

It will be understood that the disclosed embodiment is given primarily for illustrative purposes and that the method of the present invention may be employed for the determination of the isotopic boron content of samples of boron trifluoride. The activation energy for the production of ionization in a sample of a $B^{11}F_3$, is considerably different from the energy for the ionization of $B^{10}F_3$. Thus, if neutrons having energies predominately in the order of that required for the ionization of $B^{10}F_3$ are applied to a gaseous sample of $BF_3$ containing both boron isotopes in a sealed chamber such as 200 and thereafter, neutrons having energy predominately in the range of those required for the ionization of $B^{11}F_3$ are applied to the same sample of $BF_3$, the extent of ionization produced during these two applications will be in effect a measure of the isotopic boron content of the $BF_3$ isotopic mixture to which the neutrons are applied. The method of the present invention may be similarly applied to other gaseous mixture or gaseous isotopic mixtures by the employment of a suitable apparatus substantially similar to that illustratively described in the embodiment above. Such other applications of the present method and adaptations of the apparatus described above will be apparent to those familiar with the art.

Since many embodiments may be made in the above described invention and since many changes might be made in the embodiment illustratively disclosed herein, it is to be understood that all matter herein above set forth is to be interpreted as illustrative only and not in a limiting sense, except as may be required by the appended claims.

I claim:
1. An apparatus suitable for determining the isotopic abundance in a gaseous sample of a metal halide which comprises two cylindrical concentric metallic electrodes which are mechanically attached to the detachable top plate of a cylindrical gas container which envelops said electrodes when said top plate is in place on said container, said electrodes and container being resistant to corrosion by said metal halide, electrical leads connecting one of said electrodes through a resistance to the positive pole of a source of approximately 1500 volts of direct current, and connecting the other of said electrodes through a resistance to the negative pole of said source of direct current, and connecting said negatively connected electrode to a pulse current discriminator, amplifier and rate measurer, an externally surrounding vessel adapted to receive and discharge a liquid jacket ambient to said container, a source of high energy neutrons positioned externally to said container and vessel to deliver a flux of neutrons to said container, a closed end conduit sealed at its open end to said container, the closed end of said conduit extending from said conduit through said vessel into a constant temperature region, said container and conduit forming a chamber hermetically sealable by the attachment of said top plate to said container, means for supplying and evacuating metal halide gas to and from said container, conduits connecting said means and said chamber, a valve in said conduit, a pressure gauge and a conduit connecting said gauge to said container.

2. An apparatus useful for determining the composition of a gaseous sample which comprises an hermetically sealable gas container enclosing a set of electrodes, a source of direct current voltage, electrical connectors connecting said source of voltage and members of said set of electrodes to impress said voltage between members of said set, a current pulse detector connected to at least one of the members of said set, means for maintaining each succeeding gaseous sample at the same pressure, means external to said container for disposing a neutron moderator jacket ambient to said gas container and for removing said jacket therefrom, and a source of relatively high energy neutrons positioned to cause a flux of neutrons to permeate said gas container.

3. An apparatus useful for determining the composition of a gaseous sample which comprises an hermetically sealable gas container enclosing two metal electrodes, a source of direct current voltage, electrical connectors connecting said source of voltage and said electrodes to impress said voltage between said electrodes, a current pulse detector connected to at least one of said electrodes, means for maintaining said gas at its equilibrium pressure with a condensed sample thereof, means external to said container for disposing a neutron moderator jacket ambient to said gas container, and a source of relatively high energy neutrons positioned to cause a flux of neutrons to permeate said gas container and for removing said jacket therefrom.

4. An apparatus useful for determining the composition of a gaseous sample which comprises an hermetically sealable gas container enclosing two concentric tubular metal electrodes, means for supplying gas to said container, means for establishing the equilibrium pressure of said gas above its solid, a source of direct current voltage, electrical connectors connecting said source of voltage with said electrodes to impress said voltage between said electrodes, a current pulse detector connected to at least one of the electrodes, means external to said container for disposing a liquid neutron moderator jacket ambient to said gas container and for removing said jacket therefrom, and a source of relatively high energy neutrons positioned to cause a flux of neutrons to permeate said gas container.

5. An apparatus useful for determining the composition of a gaseous sample which comprises an hermetically sealable gas container enclosing two concentric tubular metal electrodes resistant to the corrosive action of fluoride-containing gases, means for supplying gas to said container, means for establishing the equilibrium pressure of said gas above its solid, a source of direct current voltage, electrical connectors connecting said source of voltage with said electrodes to impress said voltage between said electrodes, a current pulse detector connected to at least one of the electrodes, means external to said container for disposing a liquid neutron moderator jacket ambient to said gas container and for removing said jacket therefrom, and a source of relatively high energy neutrons positioned to cause a flux of neutrons to permeate said gas container.

6. A method of determining the relative abundance of $U^{235}$ and $U^{238}$ isotopes in a gaseous sample of $UF_6$ involving measuring the extent of fission induced ionization produced in a standard gas sample and in a test-gas sample and correlating the measurements made to determine the test-gas composition which comprises, maintaining said $UF_6$ in an enclosure at the equilibrium pressure of its vapor when a solid sample thereof is maintained at 0° C., establishing an electric field of approximately 1500 volts in said gas, causing fission induced ionization of said gaseous $UF_6$ by subjecting said gas to the action of neutrons having energies in the order of ten million electron volts, interposing a moderator containing a large percentage of a hydrogenous substance between said gaseous $UF_6$ and said source of ten million electron volt neutrons to cause a larger number of neutrons entering the enclosure to be moderated to thermal energies and repeating this procedure for standard gas samples.

7. An apparatus useful for determining the composition of a gaseous sample which comprises an hermetically sealable gas container enclosing a chamber, a set of electrodes disposed in insulated relation within said container, a source of direct current voltage, electrical connectors connecting said source of voltage and members of said set of electrodes to impress said voltage between members of said set, a current pulse detector connected to at least one of the members of said set, means for introducing and removing gaseous substances to and from said chamber and for maintaining said gaseous substances at known constant pressure, a radioactive source of neutrons disposed to produce a flux of neutrons in said container, and means for lowering the energy of the neutron flux in said chamber to a reproducible low value of approximately thermal energy comprising means for interposing and removing a neutron moderator substance between said source and said chamber.

8. A method of analyzing gaseous substances comprising introducing a quantity of test gaseous substance into an hermetically sealable chamber, establishing an electrical field within the chamber, ionizing said gaseous substance by establishing a neutron flux of higher energy in said chamber and by establishing a neutron flux of lower energy in said chamber, said neutron fluxes being separate in point of time, removing the gaseous substance from said chamber, introducing the same quantity of a similar gaseous substance of standard composition into said chamber, ionizing said standard gas by establishing neutron fluxes of the same high energy and of the same low energy as were previously established, said neutron fluxes being separate in point of time, the extent of the difference of said ionizations being a measure of the composition of said test gaseous substance.

References Cited by the Examiner

UNITED STATES PATENTS

| | | |
|---|---|---|
| 2,220,509 | 11/40 | Brons. |
| 2,302,247 | 11/42 | Neufeld _____ 250—83 |
| 2,436,084 | 2/48 | Weller. |
| 2,521,656 | 9/50 | Segre et al. _____ 250—83.1 X |
| 2,532,874 | 12/50 | Anderson _____ 250—83.1 X |
| 2,585,649 | 2/52 | Hanson. |
| 2,631,245 | 3/53 | Cohen _____ 250—83 |

OTHER REFERENCES

Kennedy et al.: MDDC–973, U.S. Atomic Energy Commission document dated March 26, 1943, pages 1–4, declassified May 23, 1947.

Segre et al.: Review of Scientific Instruments, volume 18, pages 86–89 (1947).

Spinks et al.: Canadian Journal of Research, volume 28, page 62 (1950).

Stranathan: The "Particles" of Modern Physics, page 390 (1942), The Blakiston Company, Philadelphia.

RALPH G. NILSON, *Primary Examiner.*

ARTHUR W. CROCKER, JAMES L. BREWRINK, SAMUEL BOYD, ROGER L. CAMPBELL, WILLIAM G. WILES, *Examiners.*